Patented July 7, 1931

1,813,488

UNITED STATES PATENT OFFICE

ROBERT F. FIELD, OF WATERTOWN, MASSACHUSETTS, ASSIGNOR TO ATLANTIC PRECISION INSTRUMENT COMPANY, OF BOSTON, MASSACHUSETTS, A CORPORATION OF MASSACHUSETTS

OSCILLATORY CIRCUITS AND METHOD OF COMPENSATING FOR VOLTAGE CHANGES IMPRESSED THEREON

Application filed October 21, 1927. Serial No. 227,694.

This invention has to do with oscillatory circuits and their excitation and has for its object to permit such excitation to be effected from commonly available sources of nominally constant voltage but having in fact such voltage or potential variations as are likely to be met with in commercial lines, and yet permit such circuits to serve their ultimate purposes.

More specifically this invention has for its object to provide means for exciting high frequency circuits such as are shown in the application for patent of Albert Allen, Serial Number 166,705, filed February 8, 1927, for means for measuring characteristics of material, the excitation to be so accomplished that the indications of the instrument therein which is responsive to variations of weight or other characteristics of a moving web or other form of material, shall not suffer misleading deviations due to variations of the voltage of the circuit from which current is supplied to the apparatus.

While my method is applicable to oscillatory circuits connected in several ways, the disclosure will be made clear most expeditiously by describing its application to the Allen circuit in a form typically illustrative, and for this purpose reference may be had to the accompanying drawings in which Figure 1 is a typical wiring diagram of a measuring mechanism making use of primary and secondary high frequency tuned oscillatory circuits as illustrated in the Allen application to which reference has heretofore been made.

Figure 6:
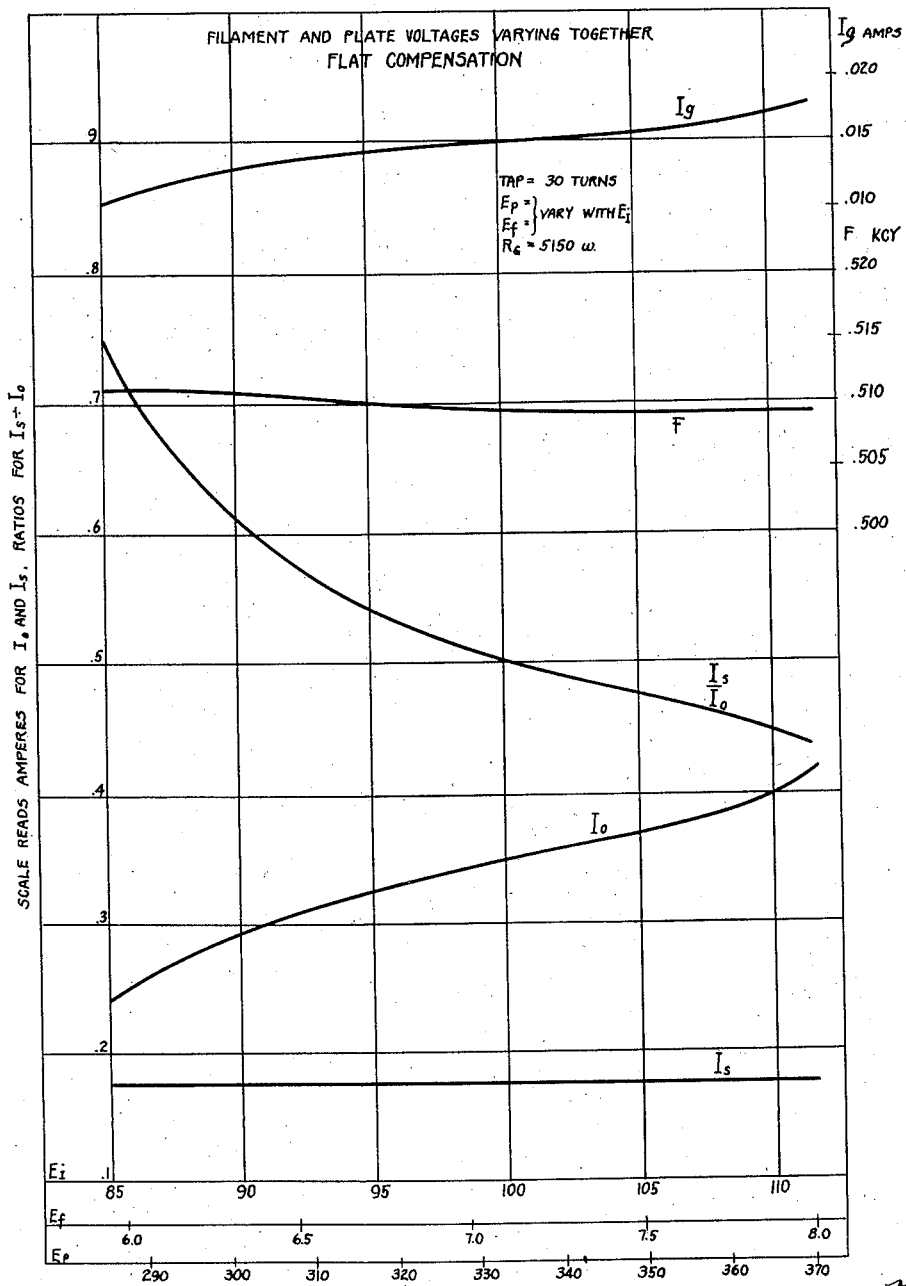

Figures 6 to 11 inclusive show graphically the effects of variations of impressed voltage on the secondary current under different conditions, Figure 6 showing conditions for good compensation over a considerable range of impressed voltage changes.

Figure 12:
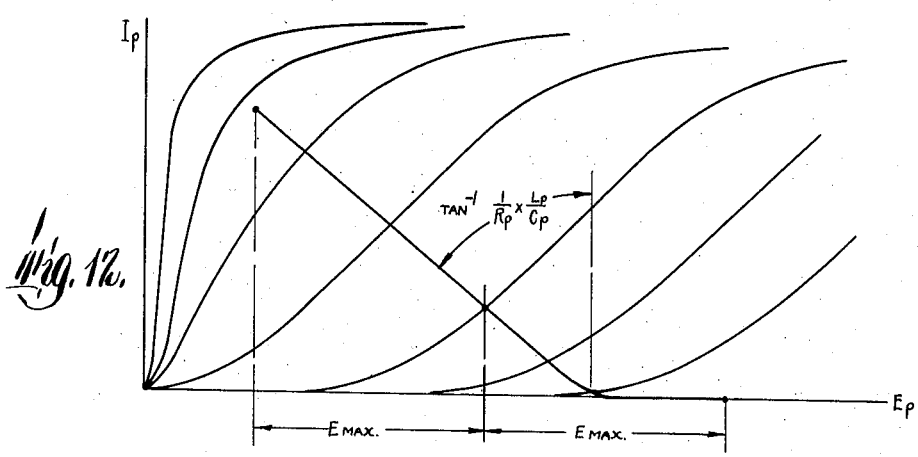

Figure 12 shows graphically the operating path of an electron tube.

Figure 13:
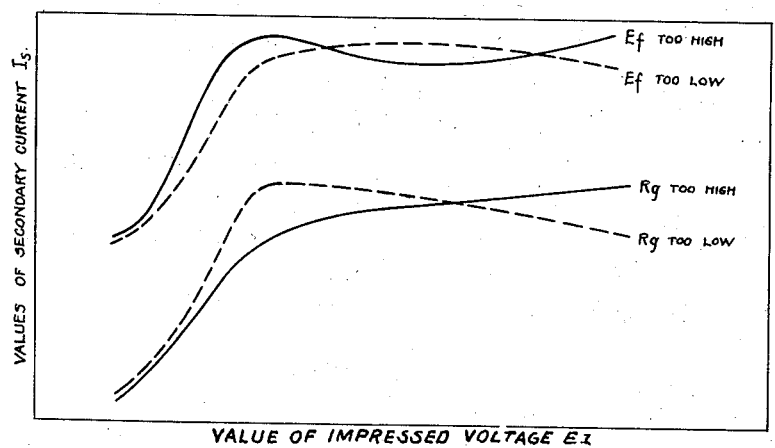
Figure 14:
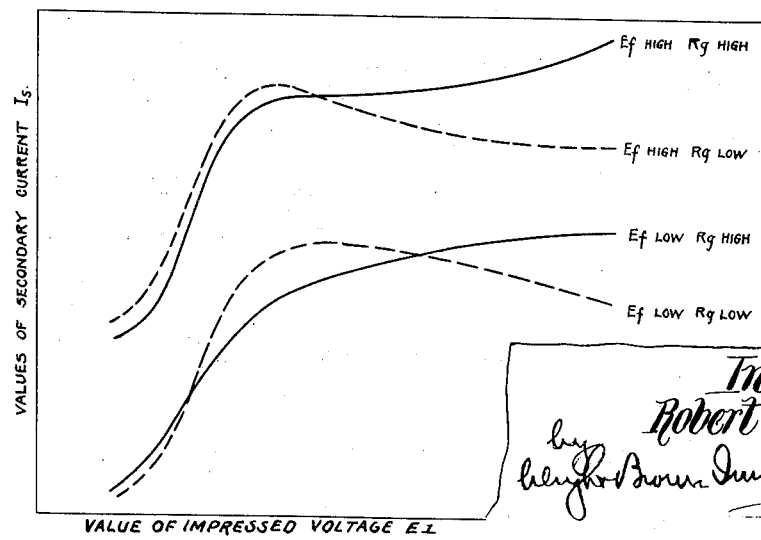

Figures 13 and 14 show the effects of slightly incorrect values of quantities adjustable as final steps in obtaining flat compensation whereby the changes necessary for obtaining correct adjustment may be recognized and made.

Figure 1:
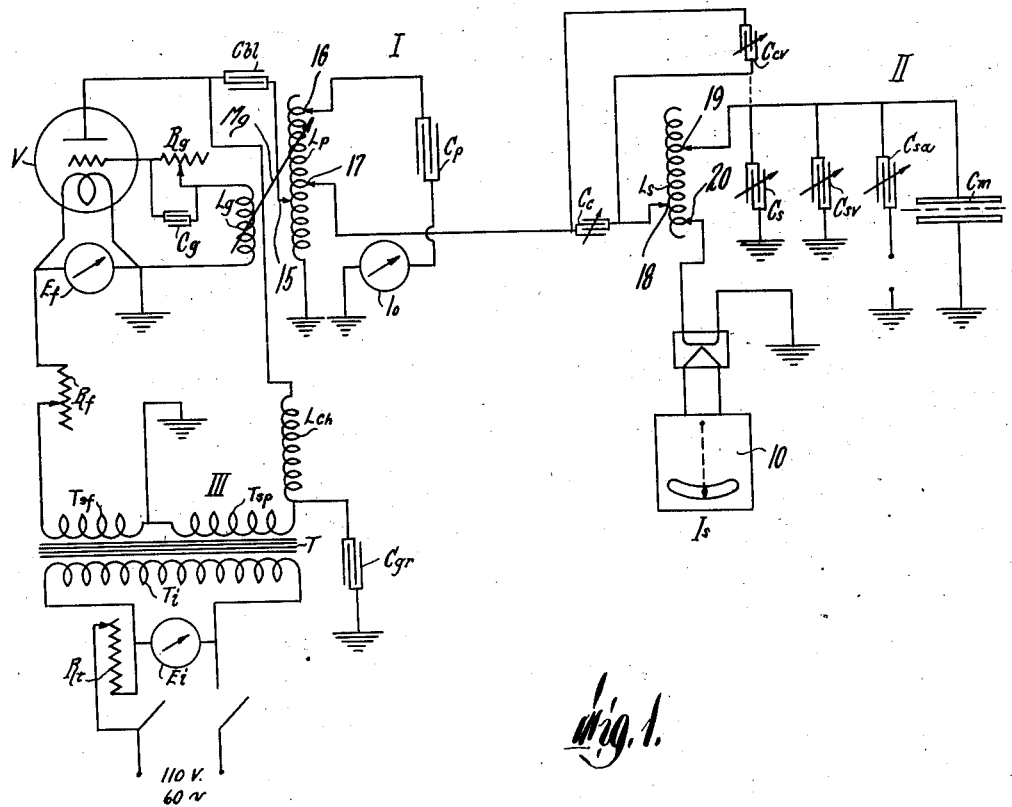

Referring first to Figure 1, I represents an oscillatory electric circuit excited to generate a wave train of determinable periodicity by connection with a commercial source of alternating current and coupled to a receiving circuit II containing inductance and capacitance of such values that it is susceptible of being tuned to exact resonance with the said wave train but is in fact tuned enough off resonance to give a partial response measured by a thermo-ammeter 10 in that circuit which response increases in amplitude if exact tuning is more nearly approximated, and decreases if exact tuning is further departed from. This tuning off the resonance peak might be on either side of the resonance curve, that is, the secondary tuned circuit II might, on the one hand, contain less capacity than that value which would tune it to exact resonance with the impressed wave train, in which case it would resonate better and give response of greater amplitude if more capacity were added and might then be described as tuned on the low-capacity high-frequency side of the resonance curve, or on the other hand, it might contain more capacity than that which would tune it to exact resonance and might then be described as being tuned on the high-capacity low-frequency side of the resonance curve. As will later appear my method of compensation for impressed voltage variations definitely requires operation on the low-capacity high-frequency side.

In the Allen instrument a part of the capacitance of the secondary or receiving circuit II consists of a measuring or weighing condenser $C_m$ adapted to receive between its plates the moving web of paper, rubber or other material, or a representative part thereof, and to have its capacity augmented thereby in an amount determined by the mass and dielectric constant of the web or other moving material, and thus if the substance remain unchanged, determined by the weight per unit area of the said web or other material.

The current induced in the receiving or secondary circuit, which may be represented by $I_s$, determines the indications of the instrument 10, which may be a sensitive thermo-ammeter, and these indications are taken as readings of the weight of the material between the plates of the condenser $C_m$.

The changes in this secondary current and in the corresponding instrument indications are determined under practical conditions, mainly by the changes in mass or weight of the material passing between the plates of the measuring condenser $C_m$. They are determined completely by these weight changes in conjunction with a number of correction factors. If the summational effect of these correction factors can be brought within a value satisfactorily small compared to the weight variations that it is the purpose of the instrument to show or control, then with a given suitable adjustment of the apparatus, the secondary current will afford a practicable indication of the weight of the moving material. Some of these correction factors are of slight importance and occasion no difficulties in practice, and others may be satisfactorily compensated for.

The present invention has to do with one only of these factors, namely, variations in impressed voltage of the electrical supply of an amount likely to occur in commercial circuits, which, if their effect be not compensated for, are capable of introducing errors large in comparison with changes of weight in material that it is sought to measure and are thus capable of vitiating the entire indication of the instrument.

Figure 1 shows the circuits arranged for receiving current from an alternating lighting circuit, since this is the most commonly available source of electrical energy. Direct current source may be used by the use of storage batteries, motor generators or potentiometer connections. The present disclosure, however, will deal directly with the alternating current supply, the circuits of Figure 1 being arranged for such supply, this being indicated at III.

The primary oscillatory circuit group I is of well known type having electron tube V, an oscillatory circuit $L_p$ $C_p$ $I_o$, and inductive feed-back $(L_p L_g) \rightleftharpoons M_g$, feeding an oscillating component of current to the grid through a condenser $C_g$ around the polarizing grid leak $R_g$. This primary circuit receives energy from the lighting-frequency transformer T of the circuit group III and delivers energy to the secondary tuned circuit group II through the variable capacitative coupling $C_c$, $C_{cv}$ having a variable mutual capacitance.

The connections of the circuit I to circuit III comprise a filament circuit from the secondary $T_{st}$ of the supply-transformer through filament rheostat $R_t$ and back through ground; the voltage at the filament is measured by the filament voltmeter $E_t$ across this circuit. The connections to the circuit III further comprise a plate circuit from secondary supply transformer winding $T_{sp}$, through ground to filament, through vacuum tube to plate, and back through a radio frequency choke coil $L_{ch}$, and a connection grounded through radio frequency capacitance $C_{gr}$, to $T_{sp}$, the purpose of $L_{ch}$ and $C_{gr}$ being to keep radio frequency current from the low frequency transformer. The plate circuit delivers energy at radio frequency to the primary tuned oscillatory circuit via the plate coil $L_p$ at a suitable tap, at a position defined later, through a blocking condenser $C_{b1}$ adapted to keep low frequency current out of the oscillatory circuit.

The primary oscillatory circuit delivers energy to the secondary tuned circuit II through the coupling capacitances shown at $C_c$ and $C_{cv}$, these being connected to the primary oscillatory circuit I at a tap on the plate coil somewhat removed from the grounded end of that coil, as shown. A suitable point for such connection will be defined in due course. The two capacitances $C_c$ $C_{cv}$ in parallel could be a single capacitance except that two adjustments having different functions are used, as and for reasons disclosed fully, along with a complete description of said circuits in the Allen application for patent hereinbefore referred to, and it is more convenient to perform one of these functions through one part of the coupling capacitance and the other through the other. Inductive coupling between the circuits I and II can be used perfectly well and other changes might be made, but the present disclosure will be particularly described as applying to the circuits of this figure, which are, on the whole, deemed preferable.

The secondary or receiving circuit II is an oscillatory circuit having inductance $L_s$ and capacitances $C_s$, $C_{sv}$, $C_{sa}$ and $C_m$, connected or connectible thereto as subsequently described, and provided with the instrument 10, preferably of thermo-couple type, responding to the current $I_s$ flowing in this circuit. The constants of this circuit are such that it can be tuned to resonance with the frequency $F_p$ of the wave train generated by the primary circuit I or de-tuned to resonate to frequencies somewhat removed from that. Of the four capacitances, $C_s$ is for substantial adjustments, and $C_{sv}$ for vernier adjustments of the natural frequency or tuning of the circuit; $C_{sa}$ is for occasional use in checking the normality of the circuits and adjustments under conditions and in the manner described in the application for patent of Albert Allen hereinbefore referred to, and is not connected during weighing operations, and $C_m$ is the measuring condenser characteristic of the apparatus, and with which the moving material which is to be weighed is adapted to be progressively related. Ordinarily this measuring condenser $C_m$ has its plates disposed on opposite sides of the moving material to be weighed and this weighing is the function of the apparatus as here described. It may be adapted to certain other functions as explained in the Allen application, but the compensation for changes in impressed voltage as disclosed in the present application can be applied in any case where these related circuits are used. Increases in the mass of the material to be weighed increase the capacity of this capacitance thereby increasing the free period and decreasing the natural frequency of the circuit II, and thus changing its tuning relative to the wave train emanating from the primary circuit coupled with it, and correspondingly changing the degrees of its response thereto. If the secondary circuit II is initially somewhat de-tuned relative to the primary I on the side of low-capacity and high-frequency, such increase of mass will therefore improve the tuning and increase the response, that is, will increase the amplitude of the secondary current $I_s$, and thus cause the instrument 10 to give a higher indication, and this is the condition in practice.

Circuit III may be a commercial alternating current circuit of, say, 110 to 115 volts and 60 cycles, the source most commonly available, and Figure 1 shows connection to such a circuit.

The principal object of this invention, expressed more specifically, is to so design and relate the parts of the circuit groups I, II, and III, as shown in Figure 1, that the response of the current flowing in the secondary receiving circuit II under the conditions met in the course of practical operation shall not be affected appreciably by changes of voltage of the supply circuit III. Commercial circuits supplying circuit III are subject to voltage variations often reaching 5% and occasionally much more, circuits for motor generator sets are affected by voltage or cycle variation of the motor supply and thus generate variable voltage if supplied from a commercially variable source, and batteries progressively run down and change their voltage if used in the ordinary way. The relationships to be hereinafter disclosed and defined are quite capable of reducing the effect of a 10% variation of impressed voltage to less than 1% total deviation of the instrument 10 and of giving compensation within 2½% total for voltage variations of 20%.

In my investigation of principles furnishing means for so relating and critically proportioning these circuits that changes of supply voltage shall have negligible effect upon the secondary current response, the number of factors entering was found to be relatively large, some of these factors showed behavior not heretofore accredited to them, and the theory governing the actual effects of these factors turned out to be inordinately complicated. It is therefore certain that the matter can be presented most clearly by a non-mathematical statement of method, along with graphic examples of compensatory relations, a statement defining one example of initial proportions, and criteria whereby maximum compensation with such proportions can be established.

Figure 2:
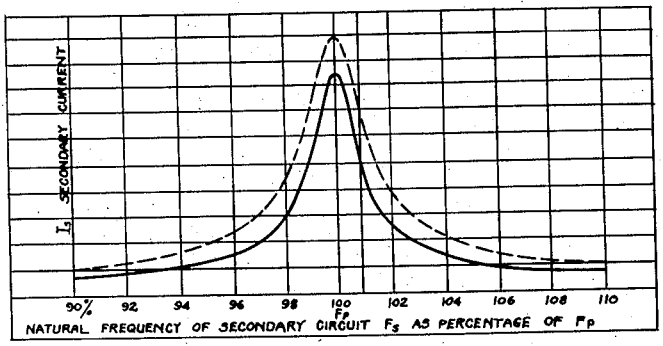
Figures 2, 3 and 4 are resonance curves, Figure 2 showing current amplitude changes in the secondary circuit due to current variations in the primary circuit, Figure 3 showing effects of change of primary frequency, and Figure 4 showing compensation between the two effects of Figures 2 and 3.

Proceeding to such a treatment:

Other things being equal the current $I_s$ induced in the secondary circuit II will be determined ($a$) by a current $I_o$ flowing in the primary circuit I, and ($b$) by the degree of tuning of the secondary circuit II relative to the frequency set up by the circuit I. Figure 2 illustrates this for the simple case where the degree of coupling and magnitude of secondary current are such that reaction of the secondary current on the primary frequency may be disregarded. The resonance curve of Figure 2 shows oscillatory current induced in the secondary circuit II plotted against natural frequency of the same circuit, the latter being expressed as a percentage of the actual frequency of the wave impressed upon this circuit from the primary circuit I through the coupling $C_c$ $C_{cv}$. Its peak is at the frequency of the oscillations existing at the time in the primary circuit I and it shows at any point by its ordinate the current response in the coupled secondary circuit II when it is so tuned that it would give maximum or resonant response to a primary frequency shown by the abcissa corresponding.

Now, obviously, if the current $I_o$ in the primary circuit I be increased while other things remain equal, the whole scale of secondary current ordinates of a resonance curve plotted in this way will increase in direct proportion. The dotted curve in Figure 2 illustrates this. Thus anything that increases the primary current $I_o$ (the current in circuit I) will act to increase secondary indication $I_s$ (the current in circuit II), and conversely.

Other things being equal and in the absence of compensatory actions, an increase of impressed voltage in the feed circuit III within the range normal to the tube V will unavoidably increase $I_o$ and hence $I_s$, and conversely; and since the current $I_s$ in circuit II must be taken as a measure of weight of the specimen, will therefore, in absence of compensation, procure a false indication of weight of the passing material.

The compensatory factor is found in a method of procuring changes of tuning of the two circuits relative to each other in inherent response to changes of impressed voltage, these changes of tuning being of a magnitude and in a direction such that upon an increase, say, of impressed voltage in circuit III, there will be just as much decrease of current response in the secondary circuit II due to detuning between the circuits II and I as there is increase of that response due to increase of primary current in circuit I. This in brief is the principle of the method hereinafter disclosed.

Relative changes in degree of de-tuning between the primary circuit I and the secondary circuit II could obviously be obtained by changing the frequency of the wave train generated by the primary circuit or by changing the natural free period of oscillation of the secondary circuit II. In the present method the change is made in frequency of the wave train generated by the primary circuit, which can be made to depend inherently on the change of impressed voltage in the circuit III.

Figure 3:
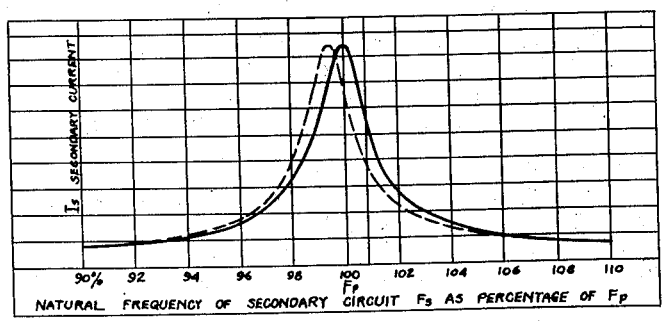

Figure 3 shows by dotted resonance curve the effect of reducing the frequency of the primary wave train by slightly less than 1%. The values of responsive oscillatory currents in the secondary circuit II are shown at various tunings or natural frequencies of this circuit, still expressed as percentages of the original wave frequency impressed by the primary circuit I, not of the reduced wave frequency, in the dotted graph shown as current response to primary excitation at about 99% of original frequency. The full line is identical with the full line of Figure 2. The degree of this de-tuning effect depends not only upon the change of frequency of the primary, but upon the steepness of the resonance curve, which is determined by the constants of the circuit II, and especially by the energy losses in that circuit, usually stated in the terms of a summation of the equivalent resistances to which all of those losses may be converted.

Figure 4:
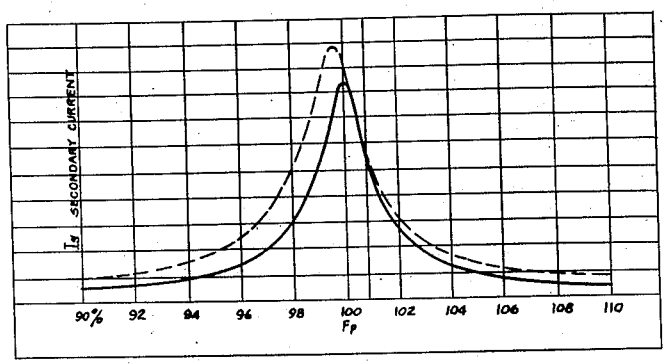

Obviously, the effect of changing the scale of ordinates of the resonance curve by change of primary current (see Figure 2) may be offset by a definite consonant change of relative tuning (see Figure 3), this being illustrated in Figure 4, but this can be done only if the latter change is in the right direction relative to the former. It turns out in fact that this can be accomplished by the method herein disclosed only if the secondary circuit II is operated with less capacity and therefore at higher frequency than would be the case if it were tuned to exact resonance with that of the primary wave train.

Figure 5:
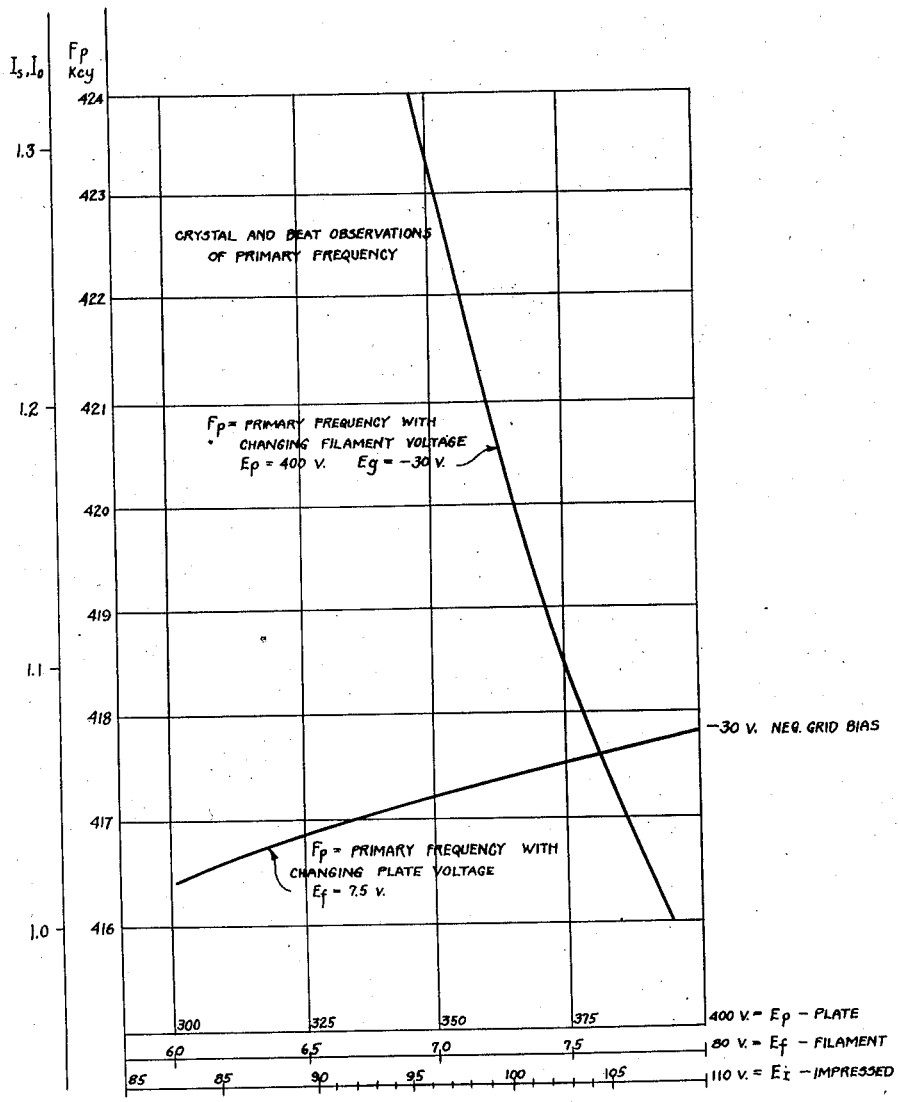
Figure 5 shows graphically the effect of voltage changes on frequency of an oscillatory circuit.

That the primary frequency $F_p$ of the circuit I is actually changed by change of impressed voltage under suitable conditions is illustrated in Figure 5 in which actual values of frequency as determined by a crystal-and-beat method are plotted against (a) variable plate voltage with constant filament voltage and (b) variable filament voltage with constant plate voltage, the grid bias being held constant in both cases. Primary frequency is seen to increase slightly with increase of plate voltage and to decrease rapidly with increase of filament voltage. For this experiment a direct current source for both plate and filament voltage was used and there was no secondary circuit except the crystal oscillator. The drop in frequency with increase of filament voltage thus is an actual change in the primary frequency $F_p$, unaffected by any interaction of coupled circuits, which appears when the coupling is closer and the secondary current is larger, as will be pointed out.

The use of an alternating in place of a steady plate voltage causes the current $I_o$ flowing in the primary circuit I to vary during the cycle of this low frequency alternating voltage, being greatest at some time during the positive half cycle and damping out to zero at some point early in the negative half cycle. Thus the observed current $I_o$ is an average of a set of values varying throughout the low frequency cycle and therefore will depend on the wave form and frequency of this palte voltage. Also since the primary frequency $F_p$ varies somewhat with the plate voltage, it will depend slightly on the wave form and frequency of an alternating plate voltage. The use of an alternating instead of a steady filament voltage causes the current $I_o$ and the frequency $F_p$ of the primary circuit I to vary and the observed values are averages depending upon wave-form and frequency. But since these changes are really dependent on the temperature of the filament, which can cool but little as the alternating filament current passes through its zero values at commercial frequencies, the dependence upon wave-form and frequency is very slight.

Compensation for impressed voltage variation can best be considered as the resultant effect of a number of related factors taken in two groups: (A) as affecting primary current ($I_o$), and (B) as affecting primary frequency $F_p$. These factors have been studied individually, although in fact a change in one factor generally changes others and may thereby set up important reflex changes in the one first considered. These two groups take in and employ the effect of all the factors. As might be expected, the relations of the factors that enter these two groups and determine their effects upon each other, and particularly determine the frequency of circuits excited by a radio tube in oscillation is exceedingly complex, but their study has developed some quite unexpected and apparently paradoxial facts with relation to the frequency changes of the oscillatory system in response to voltage changes impressed on an oscillating tube.

Such parts of the theoretical relationships governing this compensation as have been thus far developed by physical observations and graphical analysis to show relations of variables, and the beginning of mathematical analysis of these single relationships, have progressed sufficiently far to give adequate basis for proportioning and adjusting circuits of the type shown in Figure 1 that will show good compensation over considerably more than usual ranges of variations of commercial voltages, and such a basis is hereinafter disclosed with clear directions for its application. The exact reasons for some of the co-related inter-actions are still elusive, but the conditions which will reliably produce the desired actions have been identified and can be and are disclosed hereinafter without an impracticably voluminous discussion of reasons proven or believed.

The figures from 6 to 14 show graphically certain relations, effects and requirements in circuits such as those of Figure 1 and will now be taken up more in detail.

Figure 6 shows a condition of substantially "flat" compensation in an actual apparatus having the circuits of Figure 1 and designed and adapted for the weighing of rubber from a rubber calender. The condition is that of operation, that is, the plate tap on the plate coil $L_p$, the grid resistance $R_g$, and filament resistance $R_t$ are set initially to give best available compensation for variations in impressed voltage $E_1$ (first lower scale on the figure). The method of and criteria for setting these will be disclosed later in connection with the discussion of Figures 13 and 14.

The five functions plotted show responses to variation of the impressed voltage $E_1$ and to the concurrent and consequent variations of filament voltage $E_t$ and the plate voltage $E_p$. These three voltages are shown by the three bottom scales, the relation of the three being taken from observed readings. The five graphs, beginning at the bottom, are:

(1) $I_s$, the secondary current in circuit II, which gives the indication of weight of the specimen. The mid scale of the weighing instrument indicator 10 corresponds to 0.178 amperes on this graph. The result desired is to make such compensation that the reading of $I_s$ shall not vary as impressed voltage is changed. It will be seen that the compensation in this case is substantially complete between about 88 volts and 111½ volts impressed $(E_1)$. This instrument was most carefully adjusted and a tube practically devoid of gas was selected to develop the full possibilities of the apparatus and method. If a tube contains residual gas the readings of $I_s$ going up and going down will differ by a slight amount. Also slight fortuitous differences in the individual apparatus will cause one to compensate a little better than another, but a result closely approximating the perfectly flat conpensation of this apparatus can always be obtained by careful setting.

(2) $I_o$ is the current in the primary oscillatory circuit I. It increases with increase of impressed voltage but the law of its increase is governed by the constants of the design, as will appear from comparing the $I_o$ graphs here and in subsequent figures.

(3) $I_s/I_o$ is a computed graph derived from the values of the two just considered. It is of course the ratio of secondary current to the primary current generating it, and its value is a function of the relation between the natural frequencies of circuits I and II, and of the part of the resonance curve at which the apparatus is operating at the point observed. It is of great interest and importance in studying the action of the circuits and may be referred to as the "tuning factor," although this name is not completely descriptive.

(4) F is the actual frequency as observed by a suitable wave meter. This graph shows a character that might appear anomalous. It will be remembered that in discussing Figures 2, 3 and 4 it was stated that this represented the simple case where degree of coupling and magnitude of secondary current are such that reaction of secondary on primary frequency is negligible, so that the observed frequency decreased considerably with increase of filament voltage. In all usual settings of the apparatus in the present preferred form the reaction of natural secondary frequency on the primary is substantial and the frequency at which the oscillations occur is determined by the combined action of the two circuits acting as a system of coupled circuits. In this case the current in the secondary circuit is not determined from the current in and the natural frequency of the primary by the simple theory indicated above. It is quite possible for the secondary current to change considerably while the observed frequency $F_p$ of the coupled circuit system changes but slowly, remains constant, or even increases. The effect on the tuning factor of $I_s/I_o$ may be, and is found to be large in some cases where the observed change in actual frequency is small. On the other hand when the natural frequency of the primary and secondary circuits are nearly the same, the frequency at which oscillations occur may be unstable at some points and jump abruptly from one value to another as the ratio of the natural frequencies of the primary and secondary are varied. The value of this ratio at which the jump occurs is different dependent on whether it is increasing or decreasing. Thus when this ratio is carried through a cycle the frequency also passes through a cycle or loop. This phenomena has been called the "drag loop" and has been studied in recent years in connection with the design of power oscillators for broadcasting.

(5) $I_g$, grid current, is of some direct interest and it also affords a basis for computing grid voltage or "grid bias" $E_g$.

Figure 7:
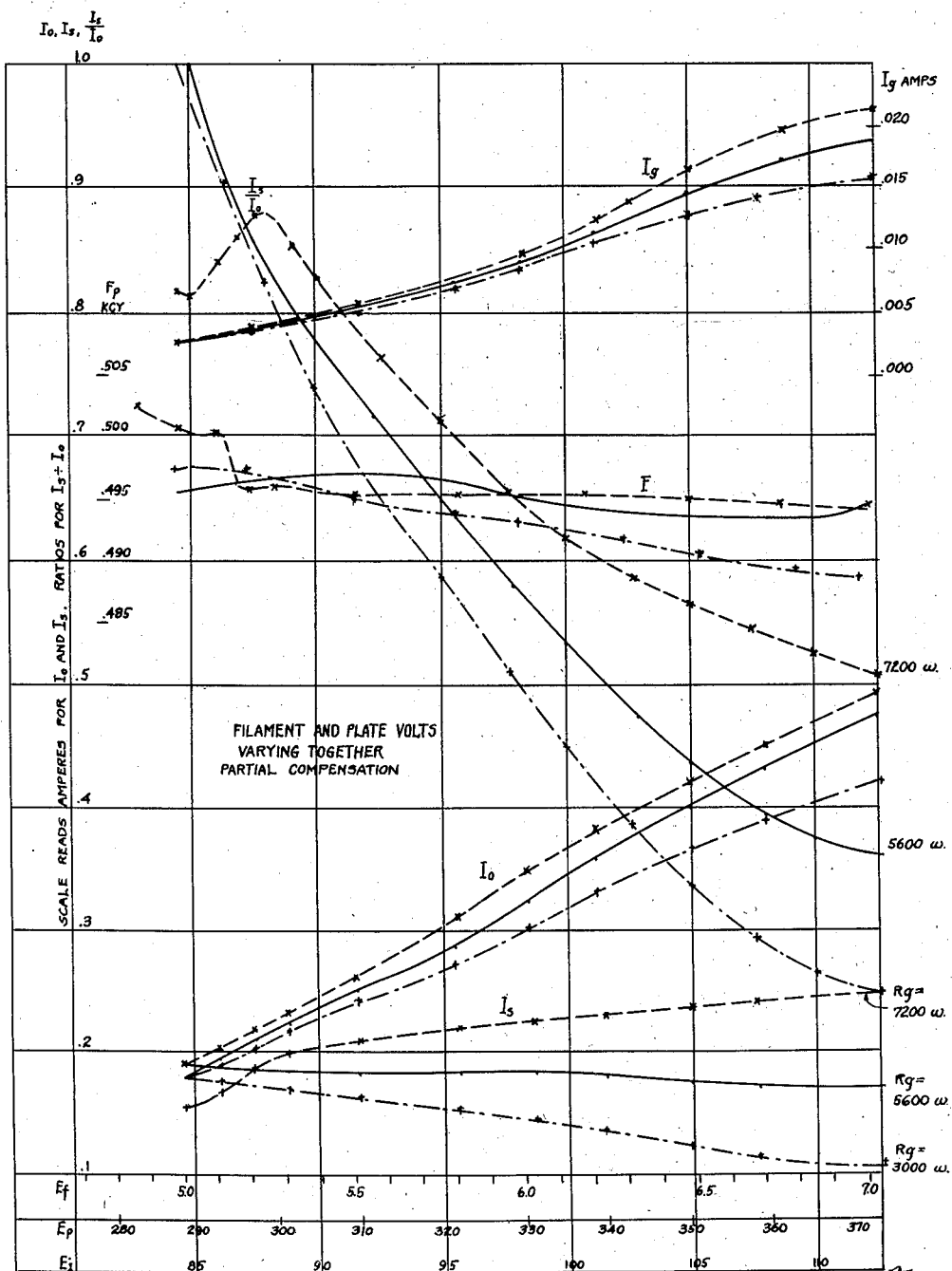

Figure 7 shows values of the same five functions for a different specimen of this apparatus with a different tube which was found by trial to give best compensation on a filament voltage about 0.95 volts lower than that best for the case of Figure 6. In Figure 7 the compensation is purposely incomplete for purposes of comparison. In this figure, three out of a "family" of curves are shown in each of the five graphs. These differ from each other in value of grid resistance only and thus show typical effects of varying this factor. Certain elements of behavior not shown in Figure 6 will be pointed out in considering the five groups of curves.

(1) $I_s$, even in the best case, that with $R_g$ 5600 ohms, shows need of the re-adjustments for which criteria are given when Figures 13 and 14 are considered and will be referred to again under a discussion of these figures. With increase of about 100 ohms $R_g$, and 0.06 volts $E_f$ at 105 volts impressed, this apparatus gave compensation very close to flat, but not so close as that of Figure 6 and also showed a slight difference with the impressed voltage $E_i$ going up and coming down, probably on account of gas in the tube. The graphs shown were taken with increasing values or "going up". It should be noted that all the $I_s$ curves are predominately convex upward; that the higher $R_g$ values give an upward slope and the lower $R_g$ values a downward slope and that the 7200 ohm line shows a break under the break in frequency and the resonance peak.

(2) $I_o$, the primary current, shows more local irregularities than does $I_s$ in Figure 6. Note that $I_o$ with $R_g$ 7200 ohms does not in this case respond to the break in frequency or the resonance peak. Where the constants are such that the disturbances are sharper it may show a drop in response.

(3) $I_s/I_o$, "tuning factor". This has, as would be expected, the general form of the side of a resonance curve, and in the case of the greatest negative grid bias ($R_g$=7200 ohms) it includes the top. As stated in the discussion of Figure 6, this $I_s/I_o$ curve is merely a computed curve derived from the two preceding.

(4) F, actual frequency. The curve with the smallest grid bias ($R_g$=3000 ohms) and lowest secondary current comes nearest to the progressive direct de-tuning relative to a fixed higher secondary free period. The curve with $R_g$=7200 ohms shows the greatest departure from this. It starts with one side of a "drag loop" and during the 15 volts change (impressed) from 90 to 105 stays very close to 495,000 cycles, while the tuning factor $I_s/I_o$ shows marked and normal change.

$I_g$, grid current shows no perturbations at the resonance peak or the drag loop, but as in the case of $I_o$ it may and sometimes does with other proportioning of circuits.

Figure 8:
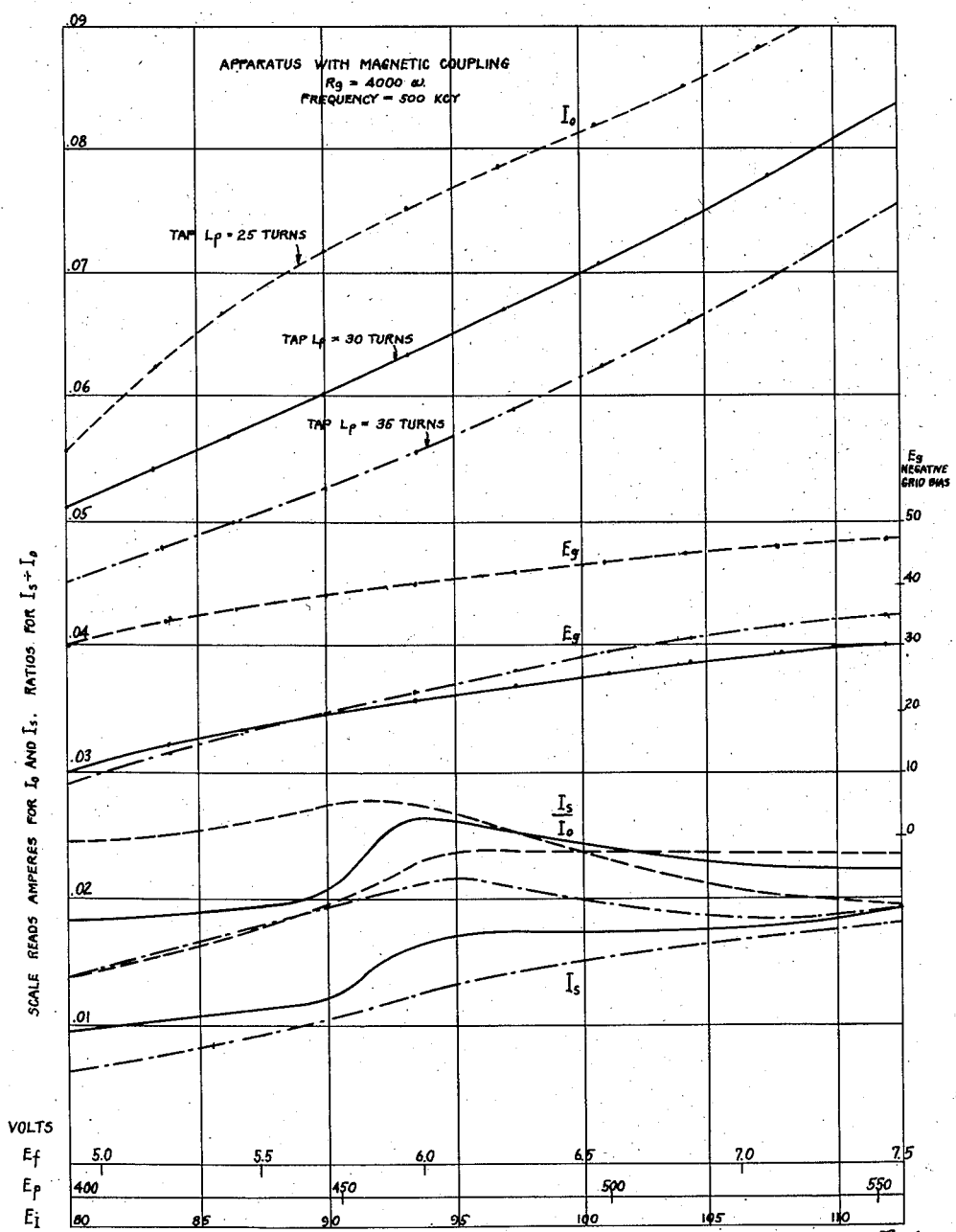

Figure 8 shows an early example of partial compensation. Here a flat spot from 95 to 103 volts was obtained with the best coupling, i. e., plate tap to $L_p$ at 30 turns from the end shown grounded in Figure 1. In the apparatus used in this case the primary-secondary coupling was a very loose magnetic "tickler coil" giving a much smaller secondary current than is used in more recent apparatus. The plate voltage was higher than shown in Figure 5 and there were other detail differences in the constants. Probably a little longer workable flat spot would have been obtained with a 29 turn tap instead of the 30 turn tap.

Figure 9:
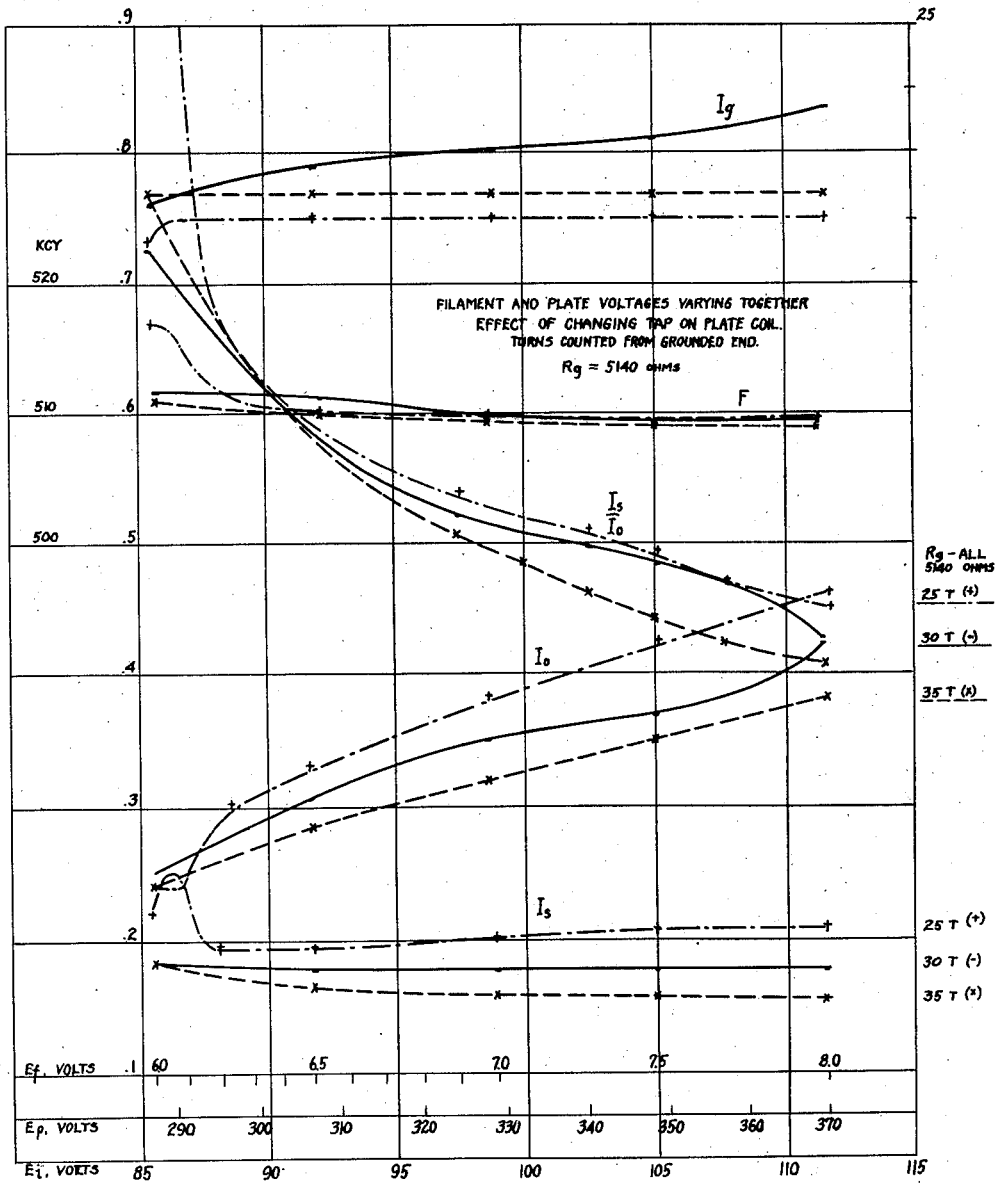

Figure 9 shows the effect of changes of tapping point on the plate coil $L_p$ for "plate tap" as does also Figure 8.

In the case of Figure 9 the apparatus was the same as used in connection with Figure 6. It will be seen that over a short range in one condition the secondary current exceeded the primary current. In Figure 8 the secondary current is never as large as .22 of the primary. This points to the explanation of the difference in behavior of frequency as has hereinbefore been stated.

Figure 10:
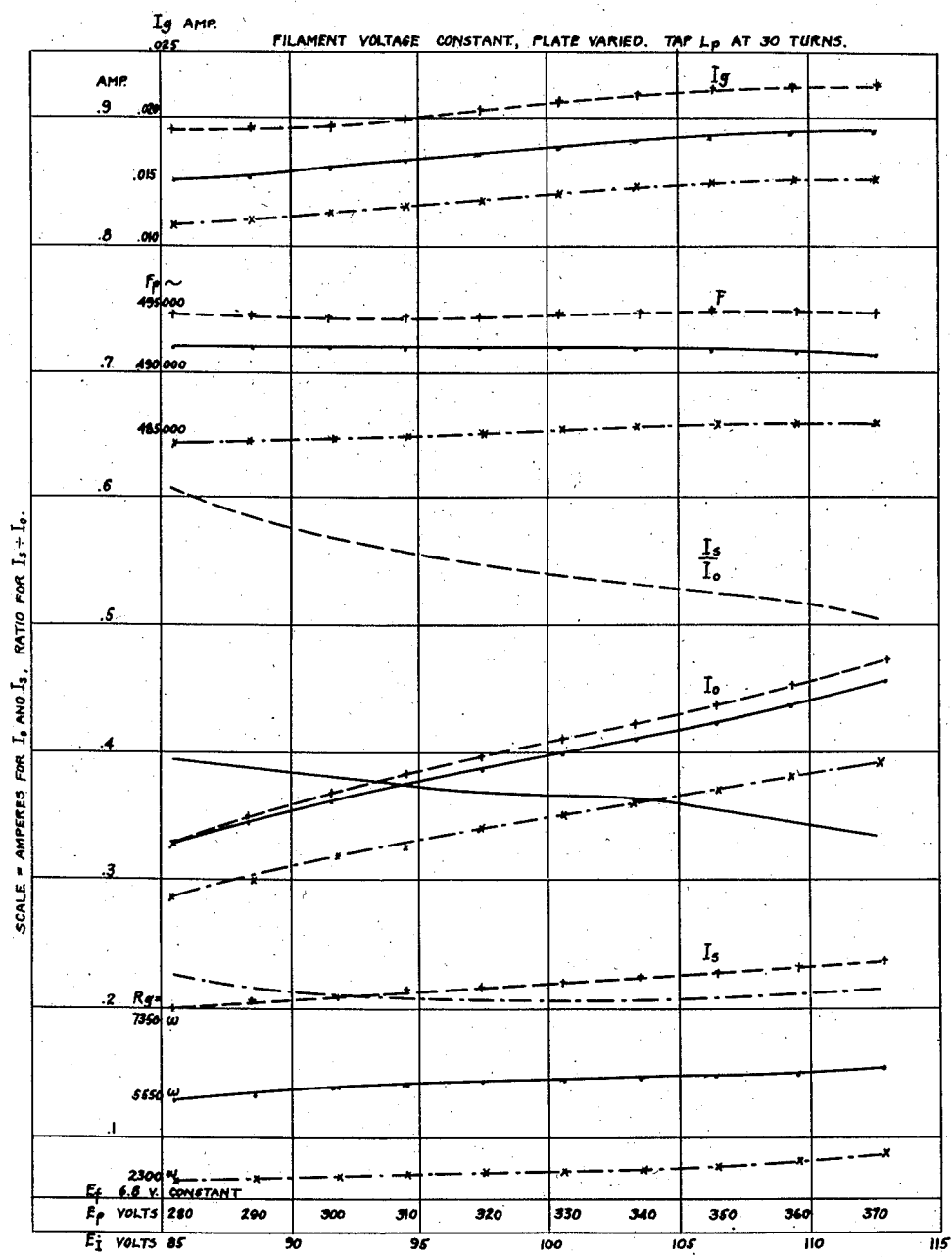

Figure 10 shows the effect of the group of factors referred to as group A previously. Here the filament voltage is held as shown constant at 6.8 volts (some other normal value might be taken as well) and plate voltage only was varied. It will be seen that changes are in general small and regular, and except possibly in the case of frequency, always in the direction that would have been predicted. Primary current increases with the increase of plate voltage as would be expected.

Figure 11:
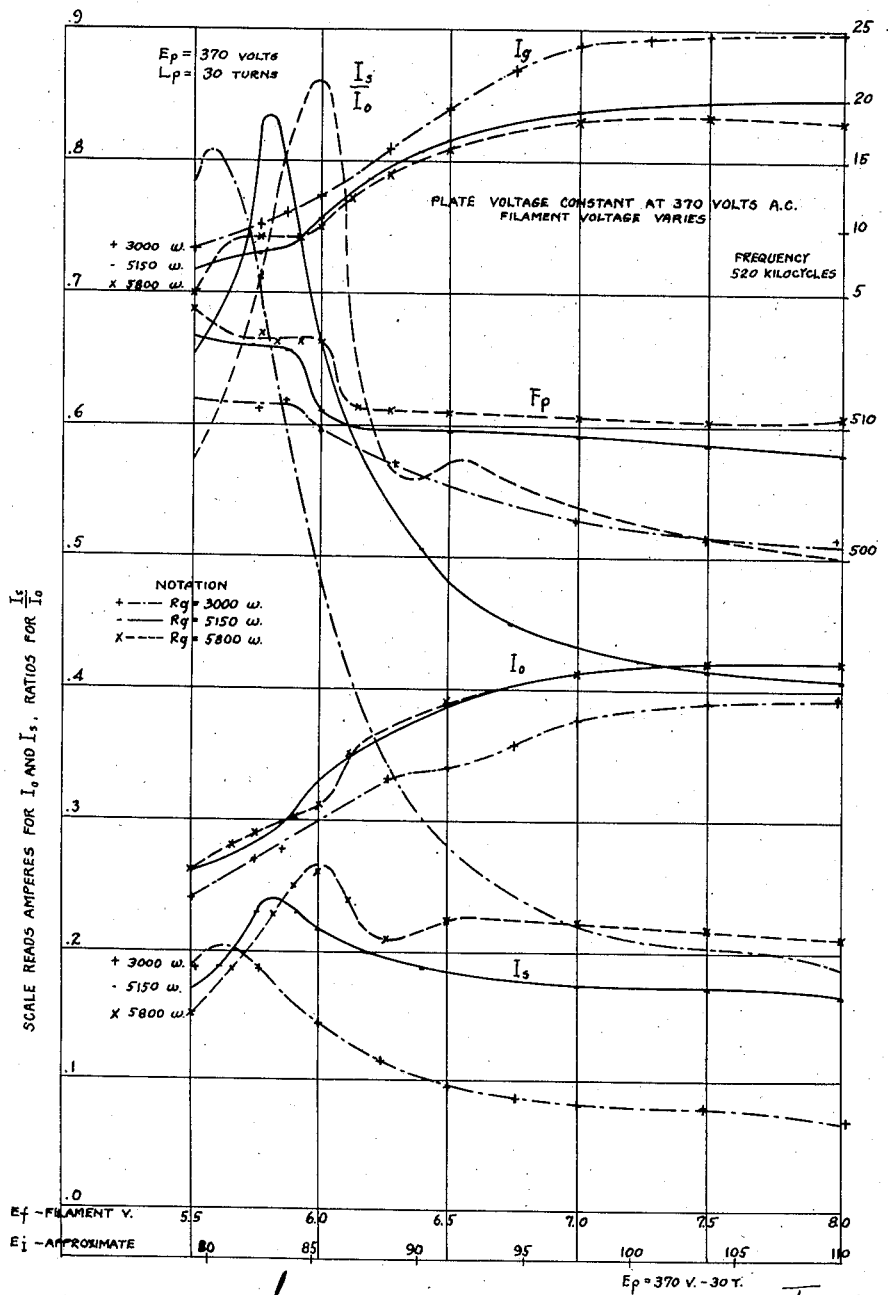

Figure 11 shows the effect of the group of factors referred to as group B, most of them the same factors that appear in group A just discussed, but in differing relation. In this figure the plate voltage is held constant at 370 volts (some other reasonable value could have been chosen if correlated as this is with that chosen for Figure 10) and the filament voltage only is varied. It will be seen that in general the changes are large and irregular. This graph shows particularly well the resonance peaks in the tuning factor $I_s/I_o$ and the drag loop in the frequency curves F. It will be noted here again that where the secondary current is smallest with $R_g$ 3000 ohms the frequency after the initial perturbations decreases along a smooth curve, seeming to indicate that here the primary tendency of the primary frequency to drop with rising filament voltage $E_t$ (see Figure 8) prevails if the reaction of the secondary current be not too high.

Figures 10 and 11 show in the full line graphs the two factorial effects entering into the complete changes of plate and filament voltages shown in Figure 6.

Figure 12 shows the well known diagram of the operating path of a tube in oscillation, and is shown for the purpose of emphasizing the fact that while a desired frequency may be obtained by using any combination of the primary circuit inductance and capacity that multiples to a certain product corresponding thereto, it is nevertheless important that the ratio of inductance to capacity be kept within certain normal limits which will give an undistorted operating path for the tube used under the conditions selected. Excessive relative value of inductance gives too flat a path with tendency of the upper end to turn down along the low-voltage lines near the vertical axis, and an excessive value of capacity tends to run the path into the high resistance region. Either makes it difficult to get good voltage compensation. The proportions given later represent good practice in this respect, although there is considerable latitude.

Figures 13 and 14 illustrate valuable practical criteria for making final adjustment for flat compensation and will be understood better by reference to Figure 7 which shows conditions illustrative of a semi-final adjustment which may be brought to best compensation by applying these criteria.

Assuming that the circuits and mechanical relationships are correct, as through following the specific example hereinafter given, and rough adjustment for compensation has been made as will be hereinafter more fully discussed, the following indications can be relied on in obtaining the final adjustments.

Referring first to Figure 13 showing readings of $I_s$ against line voltage $I_o$, it will be noted that if the filament voltage is too high the compensation curve (Figure 13, graph 1) will be convex downwardly or "hollow backed". If the filament voltage is too low the compensation curve (Figure 13, graph 1) will be convexed upwardly or "hump backed". If the grid resistance is too high then the compensation curves showing the readings against $I_s$ (Figure 13, graph 2) will slope upwardly as the line voltage increases, the instrument being under-compensated, while if the grid resistance is too low the compensation curve will slope downwardly as the line voltage increases, that is, the instrument will be under-compensated.

The graphs of Figure 14 show the effects of the four possible combinations of these departures from correct adjustment. The graphs of Figures 13 and 14 are somewhat more extreme than will usually be met with in practice, being purposely made so in order that the tendencies of the various incorrect values may be more readily apparent.

Applying the teachings of these graphs to Figure 7, it will be seen that the graph showing $I_s$ with $R_g$ 7200 ohms, slopes up to the right, thus indicating that $R_g$ is too high. With $R_g$ 3000 ohms the curve slopes down to the right, thus indicating that $R_g$ is too low, these indications being quite marked in these graphs. Similarly with $R_g$ 5600 ohms the curve is predominantly convex upwardly so that the filament voltage should be increased slightly by means of the filament rheostat $R_f$; in this particular instance something under 0.1 of a volt will be satisfactory. The curve will then be as nearly straightened as local irregularities will permit and will slope down to the right slightly. This indicates that a slight increase of the grid resistance $R_g$ should be made. This being made, the final adjustment has been effected, or possibly it may be still further refined by an additional setting of the filament resistance $R_f$.

In practice, after each adjustment of $R_g$ or $R_f$, the line rheostat $R_t$ in Figure 1 is moved back and forth to give the values of impressed voltage throughout the voltage range for which compensation is sought and the behavior of $I_s$ is observed on the instrument 10. As has already been mentioned if the tube is less fully exhausted than are the best specimens, the response to change in line or impressed voltage going up will be slightly different from that coming down, particularly if the change is slowly made, but for good commercial tubes this difference is very small.

As an example of those constants of the circuits which have been proved to be capable of good compensation for changes of impressed voltage, the following is presented.

Referring to the elements as far as practicable in accordance with the course of current in its successive transformations, the incoming low-frequency supply, through intermediate effects, to final secondary high-frequency current, of which measurement indicates the weight of the specimen:—

Switch S. A good arrangement uses two single pole switches around one of which is shunted the testing rheostat $R_t$ which may be used to produce the impressed voltage changes when testing for compensation. The testing rheostat $R_t$ may be of 20 ohms resistance, capable of carrying four amperes, having a small temperature co-efficient, and varying resistance by fine steps.

Transformer T, 110 volts primary, 400 volts and 10 volts secondaries, and 50 watts. Wound for 12 volts filament if UX 852 tubes are to be used.

Voltmeter $E_1$, 0 to 120 volt scale, normal voltage 110, 60 cycles A. C.

Voltmeter $E_f$, 0 to 12 volt scale, 60 cycles A. C. The voltage indicated by this voltmeter will vary somewhat according to the filament length of the tube and other idiosyncrasies of tubes. For example, with the UX 210 tube at 110 volts supply the average filament voltage for best compensation may vary from about 6.4 volts to 7.8 volts. Nearly any UX 210 tube will give good compensation with some voltage in this range. The final test of voltage is then found as specified in the discussion of Figures 13 and 14. Filament rheostat $R_t$ 8 ohms to carry 4 amperes with fine adjustment.

Grid rheostat, $R_g$, wire wound high resistance rheostat 18,000 ohms total. For a UX 210 tube, it will be worked in the neighborhood of 5,000 to 6,000 ohms.

Tube V. Any of the following tubes now on the market and probably others can be used with the adjustments indicated.
UX 210;
WE 205 $d$;
UX 852.

All these are worked on the same plate voltage, 400 volts A. C. direct from the transformer.

The filament voltage suitable for each tube taken at 110 volts supply is about as follows:
UX 210, minimum of 6.2 volts;
WE 205 $d$, 4.3 volts;
UX 852, 10 volts.

Tubes of one kind vary a little, particularly as to the gas content or degree of exhaustion, but any tube of these designations in salable condition can be used.

Grounding condenser, $C_{gr}$. Fixed condenser to stand 1,000 volts, one-half microfarad. Anything from one-half to double this capacity works perfectly well. Possibly the tolerance is still greater.

Grid condenser, $C_g$. Fixed mica condenser 0.0025 microfarad,—will work well with half to double this.

Blocking condenser, $C_{bl}$. This may be the same as the grid condenser $C_g$ with equal latitude.

Radio frequency choke $L_{ch}$. One satisfactory size is 150 turns of #30 wire on a tube 3" long and 1½" diameter with considerable latitude in construction of this element.

Grid coil $L_g$. The proper inductance of this coil varies somewhat, depending on the manner in which the mechanism is mounted. More inductance is required where the parts are arranged compactly in a metal case than if the mechanism is arranged in less compact form. This is probably due to the fact that the losses in the more compact form are greater. It might be wound on a bakelite tube, layer, or hit-or-miss of #30 wire in a groove of such depth and cross section that the winding does not come to the top of the groove. This tube is then pushed inside the grounded end of $L_p$ which it fits closely. Polarity is important. If on the original set-up it does not feed back, the tube or the leads to it should be reversed. The number of turns may vary from, say 35 to 55, depending on the manner of mounting the apparatus as just mentioned.

Plate coil, $L_p$. This may be wound on a 3" tube which comprises 60 turns of #22 enameled wire 24 per inch tapped every 5 turns.

Power tap 15 from the plate. This may vary from say 25 to 40 turns from the grounded end, the particular tap selected being dependent on the line voltage range which is likely to occur in practice and is ordinarily so chosen that the primary current $I_o$ through line conditions within this range lies somewhere between 0.40 and 0.65 amperes at 110 volts impressed. The effect of changes in this tapping point are shown in Figure 9.

Tap 16 for line to condenser of the primary tuned circuit. This is from 0 to 5 turns from the ungrounded end. This adjustment is made to bring the inductance of the plate coil to such a value that the desired wave length or frequency will be produced despite commercial degrees of inexactitude of the fixed condenser $C_p$. For example, for 500,000 cycles corresponding to 600 meters wave length, the product of capacity in microfarads and inductance in microhenrys must be 0.01014. Setting by a wave meter is ordinarily sufficiently close.

Coupling tap 17 to coupling capacitances $C_c$ and $C_{cv}$ will be at different points according to the strength of the primary-secondary coupling required. This depends on the loss in secondary circuit in the range of specimens to be tested with the particular instrument. With $C_c$ in its mean position and with an average specimen between the jaws of the condenser $C_m$, the rest of the secondary circuit having the values herein specified, this coupling tap on the coil $L_p$ should be at such a point that the strength of coupling, when the secondary circuit is adjusted for full resonance and therefore maximum deflection of the instrument is such that the indicator on the instrument 10 will be somewhat above full scale reading, to an amount which in the instrument herein specified will be perhaps ½" but not against the limiting stop. For example, if the instrument is to weigh rubber inner tube stock for automobile tires, this coupling tap 17 may be attached about 45 turns up from the grounded end of the coil $L_p$ which will give about the proper resonant deflection on an average thickness of that material with $C_c$ in its middle position. For thicker and thinner inner tube stock a sufficient adjustment can be made by changes of the coupling condenser $C_c$. If much heavier ranges, for instance as for tread stock are to be measured, this tap 17 would have to be put more than 45 turns from the grounded end of $L_p$ in order to keep the adjustment for varying weights of tread stock within the range of the coupling condenser $C_c$. Similarly, for measuring writing paper the coupling tap 17 would need to be nearer the grounded end of $L_p$. Thus the location of this coupling tap constitutes a coarse and the changing of the coupling $C_c$ a fine adjustment for obtaining the required strength of coupling between the primary and secondary tuned circuits I and II, respectively. Ordinarily one coupling tap adjustment would cover a suitably wide range of materials in the same general group.

Condenser $C_p$ 0.0005 microfarads.

Ammeter for measuring primary current $I_o$, 0 to 1.5 ampere scale thermo-couple type radio frequency ammeter. The working range with the proportions and relations of circuits and tube UX 210 is from about 0.40 to 0.65 amperes. The resistance of the heater circuit may be 0.25 ohms at radio frequency.

Coupling condenser $C_c$, 15 micro-microfarads adjustable two plate coupling condenser giving capacity from that named down to a small edge capacity. This is the coupling condenser proper with which the compensating condenser $C_{cv}$ is in parallel.

Compensating coupling condenser $C_{cv}$. Four micro-microfarads capacity. This is a two plate condenser adjustable as to plate distance as well as by turning into and out of mesh. The purpose of this condenser is to vary the coupling as the main adjusting condenser $C_s$ is turned, the $C_{cv}$ being connected to move with it. Its purpose is to increase the coupling when more of the total secondary capacity is in the solid dielectric condenser $C_m$ and correspondingly less in the adjusting air condenser $C_s$ because then the losses are augmented by the solid dielectric and more coupling is needed. This has been more fully explained in the Allen application to which reference has hereinbefore been made.

Secondary coil, $L_s$. This coil may comprise 144 turns spaced 24 turns per inch of #22 enameled wire on a tube 3 inches in diameter and 6 inches long, tapped every 5 turns for 50 turns from the end farthest from the ground and tapped every turn for 10 turns at the end nearest to the ground.

The working inductance when the gap of the condenser $C_m$ is ⅛ inch is about 563 microhenrys between terminal taps.

Secondary coil taps:

Coupling connection tap 18 is ordinarily connected 48 turns up from the thermo-ammeter end of the coil. Changes in this tapping point have an effect similar to that of changes in the tapping point 17 of coupling connection on the coil $L_p$, that is, they change secondary current $I_s$. Either could be used as a meter adjustment for meter 10 but it is usually more convenient to change the tap 17 only.

Condenser connection tap 19. It is connected at various points to compensate through changes of secondary circuit inductance for the effect of changes of capacity due to changes of working gap of the weighing or measuring condenser $C_m$. Thus with 48 square inch plates in $C_m$ and ⅛ inch gap, the tap will be connected 20 turns down from the end remote from the ground, while with the same plates set to $\frac{3}{16}$ inch gap, the tap will be 5 turns down. This is a coarse adjustment affecting frequency and tuning, the fine adjustment being by $C_s$.

Tap 20 to the heater circuit of the thermo-ammeter is ordinarily 5 turns up from the end, but is adjustable by single turns to give a sensitive inductance adjustment for tuning for the purpose of leaving the tuning condenser $C_s$ normally at or near the most advantageous setting rather than using up that capacity variation for initial tuning, so that not enough is left for working adjustments.

Total secondary capacity. The sum of the capacities in the secondary circuit with $C_m$ set at ⅛ inch gap and parts otherwise in the adjustments that they actually have for resonance with frequency of half a million cycles is very nearly 180 micro-microfarads. This represents the total capacities of $C_m$, $C_s$, $C_{sv}$ and the leads and other distributed capacities. Working capacity is always somewhat less so that the secondary circuit II is always on the low-capacity high-frequency side of the tuning curve and therefore increases secondary current response to primary excitation when the secondary capacity is increased by increase of weight of the specimen in $C_m$. The sum of the component capacity values given for the several elements is less than this measured total by the amount of the distributed capacity, which is considerable.

$C_s$ adjusting condenser. This should have at least 35 micro-microfarads range with about 10 micro-microfarads minimum "edge capacity". A larger range may be used if coupled with a sufficiently fine micrometric setting means, if it is desired to test a larger range of specimen weights without resetting the tap 19.

Assuming that the apparatus has been constructed in accordance with the proportions hereinbefore specified, which appear to be of great importance and some indeed rather critical for satisfactory compensation, the procedure for making adjustments to obtain flat compensation may be as follows:

With an average sample in the weighing condenser $C_m$ and the loss adjusting condenser $C_{cv}$ at about mid-position, and with the adjusting condenser $C_s$ near to its highest capacity, the strength of coupling is adjusted to give a maximum or "resonant reading" on the instrument 10 at a needle deflection somewhat above the last upper marked scale reading. This resonant reading is found from the fact that a change of position of the adjusting condenser $C_s$ either up or down from the resonant position will cause decrease in instrument deflection. At this reading the secondary circuit is fully tuned in with the primary. Adjustment of the strength of coupling is made by a coarse adjustment consisting of the selection of the tapping point 17 as previously stated, and a fine adjustment consisting in angular adjustment of the coupling condenser $C_c$. The tap should be so chosen that for an average sample and a resonance point of say ½ inch off the scale, the coupling condenser $C_c$ will be at or near the mid-position, so that there shall be leeway in both directions in the specimens without changing the tap. The plate spacing of the compensating coupling condenser $C_{cv}$ may then be adjusted by trial and error so that as it turns with the adjusting condenser $C_s$ it just makes up for difference of losses in lighter and heavier specimens by slight increase of coupling for increased weight, and keeps the resonance peak at the same height on the scale throughout the desired range of specimens. The secondary current when the indicator is at mid-position is then from ½ to ¾ that of resonant response.

Next the indicator of the instrument 10 is brought to the working point at or near the null point marked at the middle of its scale with an average sample or something near average in the weighing condenser $C_m$.

The instrument is now ready for the test for voltage compensation. Suppose that it is anticipated that the line voltage may show extreme variations between 95 and 115 volts. By means of the testing rheostat $R_t$, the voltage impressed upon the apparatus is varied between these limits and the effect upon the instrument $I_s$ is observed. If the compensation happens to be substantially exact, these changes of line voltage will not affect the reading of the instrument 10 by more than a very small amount. More commonly the instrument in this trial adjustment will show a considerable response to 20 volts variation in 115, and reference should then be had to Figures 13 and 14. The filament rheostat $R_f$ and the grid rheostat $R_g$ are then adjusted as these figures indicate, and the grid resistance being changed until the readings of $I_s$ at the upper and lower voltage limits are practically the same and the filament voltage being adjusted by means of the filament rheostat until the convexity of the curve up or down is minimized. It may then be necessary to re-adjust the grid resistance more precisely and then the filament rheostat more precisely, and so on, one or more times. The best adjustment possible for a given voltage range can be obtained in a few minutes. With the circuit specified hereinbefore good compensation can be had for 20 volts variation in a circuit of maximum voltage of 115, and fairly good compensation for a 30 volt variation. Compensation for a 10 volt variation in 115 may be made very close if wider variations need not be anticipated. The setting giving most nearly perfect compensation for 10 volts is not quite the same as that giving the best available compensation for 25 or 30 volts and it is best to compensate only for that variation which it is expected will be met. Few commercial circuits vary more than 10 or 15 volts in 115.

There are several reasons why the final adjustment of current and filament voltage may be necessary. For example, different instruments will differ from each other slightly in distributed capacity, in capacity of commercially purchasable fixed condensers nominally the same, and in other similar constants. The behavior of a given tube changes slightly after long use. Different tubes of the same kind while nearly alike may not be exactly so. The working range relative to the resonance curve may differ in slight permissible degree although it is still on the relatively straight part of this curve, as it must be. Different thickness ranges of material to be measured affect the "power factor" of the secondary circuit. Different sources of current supply have slightly different wave form which cause an instrument well compensated for a given source of current supply to be less perfectly compensated when the supply is taken from a different source having either more or less of its energy in the higher harmonics.

When putting in a new tube, replacing one of the same kind, it is usually preferable to leave the filament rheostat $R_f$ as it was and to adjust the condenser $C_s$ in the secondary circuit to give a null reading of the instrument 10. The impressed voltage is then varied over the range for which the compensation is expected by means of the testing rheostat and if there are any departures from flat compensation, the filament rheostat and the grid resistance are then adjusted as hereinbefore specified.

Having thus described this invention and having set forth by way of example the construction, proportions and constants of an instrument in which the method of this invention may be carried out most advantageously, it should be evident to those skilled in the art that various changes and modifications might be made therein without departing from the spirit or scope of this invention as defined by the appended claims.

I claim:

1. The method of neutralizing the effects on secondary current of changes of voltage impressed on the primary of coupled primary and secondary oscillatory circuits, which comprises balancing the effects on secondary current of changes in primary current flow due to changes in impressed voltage against the effects on secondary current of a compensating change in relative tuning between said circuits due to the same changes in impressed voltage.

2. The method of neutralizing the effects on secondary current of changes of voltage impressed on the primary of coupled primary and secondary oscillatory circuits, which comprises balancing the effects on secondary current of changes in the primary current flow due to changes in impressed voltage against the effects on secondary current of a compensating primary natural frequency change produced by the same changes in impressed voltage.

3. The method of neutralizing the effects on secondary current of changes of voltage impressed on the primary of coupled primary and secondary tuned oscillatory circuits, said primary circuit having an electron tube therein, which comprises balancing the effects on secondary current of the changes in plate current due to changes in plate voltage responsive to changes in impressed voltage against compensating effects on secondary current of primary natural frequency changes produced by correlative changes in plate and filament voltages due to said changes of impressed voltage.

4. The method of neutralizing the response in the secondary current to changes of voltage impressed on the primary of coupled primary and secondary tuned oscillatory circuits, said primary circuit having an electron tube therein, which comprises adjusting said circuits to maintain the free period of oscillation of said secondary circuit slightly higher than the free period of oscillation of said primary circuit, and neutralizing the effects on the secondary current of primary current changes responsive to changes of impressed voltage by the effects on secondary current of consonant changes in the natural frequency of oscillation of said primary circuit due to the same changes of impressed voltage.

5. The method of neutralizing response in secondary current to changes of voltage impressed on the primary of coupled primary and secondary tuned oscillatory circuits, said primary circuit having therein an electron tube, a grid resistance, and a filament rheostat, which comprises adjusting said circuits to maintain the free period of oscillation of said secondary circuit slightly higher than the free period of oscillation of said primary circuit, and adjusting said rheostat and resistance to such values that the effects on secondary current of current changes in said primary circuit in response to changes of impressed voltage are compensated for by effects on secondary current of consonant changes in the natural frequency of oscillation of said primary circuit due to the same changes of impressed voltage.

6. The method of neutralizing response in secondary current to changes of voltage impressed on the primary of coupled primary and secondary tuned oscillatory circuits, which comprises adjusting said circuits slightly out of resonance with each other and in such relation that an increase of impressed voltage on the primary circuit is accompanied by a relative de-tuning between said circuits and a decrease of impressed voltage is accompanied with an increase in the nearness to resonance of said circuits by amounts necessary to compensate in secondary current response for current changes in said primary circuit due to such voltage changes.

7. The method of neutralizing the effects on secondary current of changes of voltage impressed on the primary of coupled primary and secondary tuned oscillatory circuits, said primary circuit including an electron tube, a filament rheostat and a grid resistance, said circuits having substantially the proportions specified, which comprises progressively changing the voltage impressed on the primary circuit within the desired range, and adjusting the grid resistance in accordance with the secondary current flow resulting from such voltage change until the currents at the higher and lower primary impressed voltages are substantially equal to each other, and adjusting the filament voltage until the current values at the several voltages if plotted form substantially a straight line.

8. The method of neutralizing response in secondary current to changes of voltage impressed on the primary of coupled primary and secondary tuned oscillatory circuits, said primary circuit having therein an electron tube, an inductance adapted to be connected at any of a series of points to the plate of said tube, a grid resistance, and a filament rheostat, which comprises adjusting said circuits to maintain the free period of oscillation of said secondary circuit slightly higher than the free period of oscillation of said primary circuit, and adjusting the said point of plate connection to primary inductance, the said grid resistance, and the said filament rheostat to such values that the effects on secondary current of current changes in said primary circuit in response to changes of impressed voltage are compensated for by effects on secondary current of consonant changes in the natural frequency of oscillation of said primary circuit due to the same changes of impressed voltage.

9. The method of neutralizing the effects on secondary current of changes of voltage impressed on the primary of coupled primary and secondary tuned oscillatory circuits, said primary circuit including an electron tube, an inductance adapted to be connected at different points to the plate of said tube, a grid resistance, and a filament rheostat, said circuits having substantially the proportions specified, which comprises adjusting the said point of plate connection to the primary inductance to produce a primary current flow of from about .40 to .65 amperes at 110 volts impressed primary voltage, progressively changing the voltage impressed on the primary circuit within the desired range, adjusting the grid resistance in accordance with the secondary current flow resulting from such voltage change until the currents at the higher and lower primary impressed voltages are substantially equal to each other, and adjusting the filament voltage until the current values at the several voltages if plotted form substantially a straight line.

10. The method of neutralizing the effect on secondary current of a change in the voltage impressed on the primary of primary and secondary oscillatory circuits, which comprises balancing that effect of said change of impressed voltage which is transmitted to the said secondary through changes in the primary current, against that effect of said change of impressed voltage which is transmitted to the said secondary through changes in tuning relation between the said primary and secondary circuits.

11. In an apparatus for measuring the characteristics of materials by electrical means, a system of electric circuits consisting of a primary oscillatory circuit containing an electron tube and excited to oscillation by connection to a nominally constant-potential source of current whereof the voltage is subject to ordinary commercial degrees of fluctuation, and a secondary oscillatory circuit coupled to the said primary oscillatory circuit and differing in natural frequency therefrom by a small initial predetermined amount when the exciting circuit is at its nominal voltage, the said circuits being so proportioned and related that throughout the range of voltage variation of the exciting circuit any change in voltage impressed by the said exciting circuit upon the said primary oscillatory circuit will cause therein along with a change in the primary oscillatory current a concurrent change of the natural frequency of the said primary circuit of direction and amount such as to neutralize the effect of the said change of primary current upon the secondary current.

12. In an apparatus for measuring the characteristics of materials by electrical means, a system of electric circuits comprising a primary oscillatory circuit containing an electron tube and excited to oscillation by connection to a nominally constant-potential source of alternating current of frequency much lower than the natural frequency of the said primary oscillatory circuit and of voltage liable to the ordinary commercial degrees of variation of such circuits, and a secondary oscillatory circuit coupled to the said primary oscillatory circuit and differing in natural frequency therefrom by a small initial predetermined amount when the exciting circuit is at its nominal voltage, the said circuits being so proportioned and related that throughout the range of voltage variation of the exciting circuit any change in voltage impressed by the said exciting circuit upon the said primary oscillatory circuit will cause therein along with a change in the primary oscillatory current a concurrent change of the natural frequency of the said primary circuit of direction and amount such as to neutralize the effect of the said change of primary current upon the secondary current.

13. In a measuring apparatus, in combination, a primary oscillatory circuit, a feed circuit of commercially constant voltage for supplying energy to said primary circuit, a secondary oscillatory circuit coupled to said primary circuit and differing in natural frequency by a small amount to give secondary current of a desired fraction of its resonant value when said feed circuit is at normal voltage, said primary circuit having therein an electron tube, a multiple tapped inductance, the taps of which are selectively connectible to the plate of said tube, a filament rheostat in the filament feed circuit of said tube, and an adjustable grid resistance and a condenser shunting said resistance in the grid circuit of said tube, said feed circuit having means for supplying current to said filament circuit and to said plate circuit in determinate voltage ratio, such voltages being subject to variation with variation of voltage of said feed circuit, said circuits being so proportioned and arranged that by selecting one of said taps and by adjustment of said rheostat and resistance any change in the voltage of said feed circuit within its voltage variation may be caused to exert no substantial effect on current flow in said secondary circuit.

14. In a measuring apparatus, in combination, a primary oscillatory circuit, a feed circuit of commercially constant voltage for supplying energy to said primary circuit, a secondary oscillatory circuit coupled to said primary circuit and differing therefrom in natural frequency by a small amount to give secondary current of from one-half to three-quarters of its resonant value when said feed circuit is at normal voltage, said primary circuit having therein an electron tube, a multiple tapped inductance, the taps of which are selectively connectible to the plate of said tube, a filament rheostat in the filament feed circuit of said tube, and an adjustable grid resistance and a condenser shunting said resistance in the grid circuit of said tube, said feed circuit having means for supplying current to said filament circuit and to said plate circuit in determinate voltage ratio, such voltages being subject to variation with variation of voltage of said feed circuit, said circuits being so proportioned and arranged that by selecting the proper one of said taps and by adjustment of said rheostat and resistance voltage changes in said feed circuit throughout its range of changes causing consonant voltage and current changes in said primary circuit produce concurrent changes of relative natural frequency between said primary and secondary circuits such as to substantially neutralize by changes in the degree of relative resonance between said primary and secondary circuits the effect on such secondary current of said primary current changes.

In testimony whereof I have affixed my signature.

ROBERT F. FIELD.